United States Patent [19]
Yoshigai

[11] Patent Number: 5,117,948
[45] Date of Patent: Jun. 2, 1992

[54] BRAKE FOR BICYCLES

[75] Inventor: Kenichi Yoshigai, Osaka, Japan

[73] Assignee: Yoshigai Kikai Kinzoku Kabushiki Kaisha, Osaka, Japan

[21] Appl. No.: 623,406

[22] PCT Filed: Mar. 26, 1990

[86] PCT No.: PCT/JP90/00402
§ 371 Date: Nov. 30, 1990
§ 102(e) Date: Nov. 30, 1990

[87] PCT Pub. No.: WO90/11925
PCT Pub. Date: Oct. 18, 1990

[30] Foreign Application Priority Data

Mar. 31, 1989 [JP] Japan ............... 1-38291
Mar. 31, 1989 [JP] Japan ............... 1-38292
Mar. 31, 1989 [JP] Japan ............... 1-38293

[51] Int. Cl.$^5$ ............................. B62L 1/12
[52] U.S. Cl. ................... 188/24.19; 188/24.12; 188/24.21

[58] Field of Search ............ 188/24.11, 24.12, 24.14, 188/24.15, 24.19, 24.21, 24.22, 22.3, 72.9; 267/275, 277, 278, 177; 185/45

[56] References Cited

U.S. PATENT DOCUMENTS 4,793,444 12/1988 Nagano ............... 188/24.12
4,938,318 7/1990 Ishibashi ............ 188/24.19

Primary Examiner—Robert J. Oberleitner
Assistant Examiner—Chris Schwartz
Attorney, Agent, or Firm—Sixbey, Friedman, Leedom & Ferguson

[57] ABSTRACT

A bicycle brake comprising a pair of brake arms movable toward or away from each other and each having a brake shoe, an arm mount having a pivot attachable to the body of a bicycle and supporting each of the brake arms thereon, return springs for always biasing the respective brake arms away from each other to move the brake shoes away from each other, and a spring cap fixedly connected to the pivot. Each return spring has one end projecting out from the spring cap or the brake arm directly or indirectly. The spring end is movable from outside to adjust the biasing force of the spring.

4 Claims, 4 Drawing Sheets

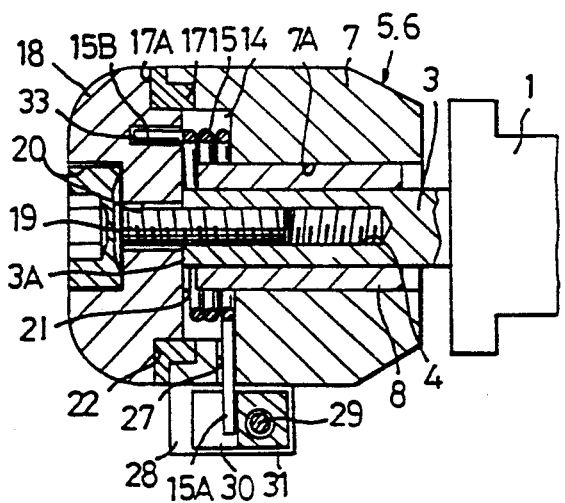
FIG. 5
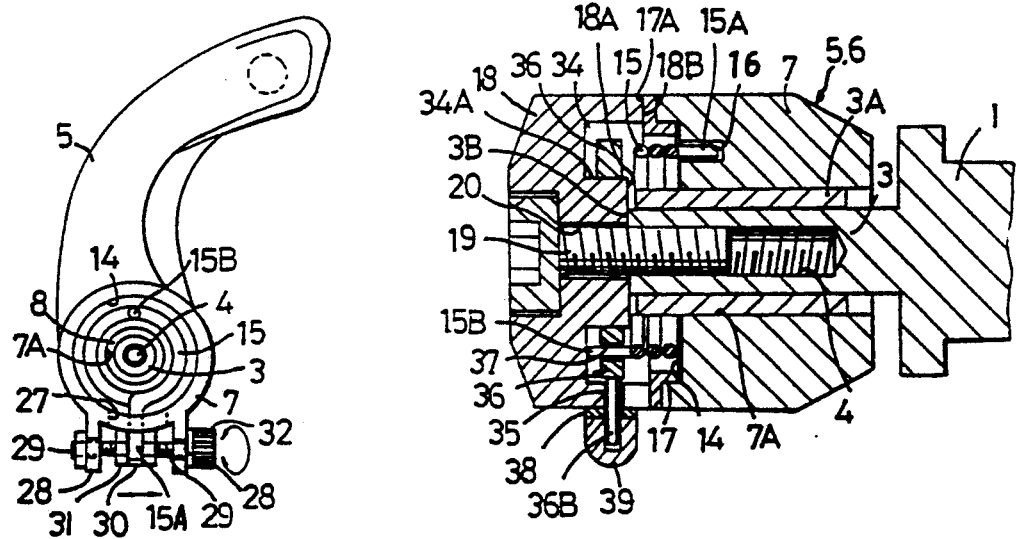
FIG. 7
FIG. 8

BRAKE FOR BICYCLES

TECHNICAL FIELD

The present invention relates to caliper brakes, cantilever brakes or like brakes for bicycles.

BACKGROUND

Conventional brakes for bicycles include, for example, a center-pull caliper brake as disclosed in Unexamined Japanese Utility Model Publication SHO 63-193127. This brake comprises a pair of brake arms movable toward or away from each other and each having a brake shoe at its lower end, an arm bracket attachable to the body of a bicycle and supporting the brake arms thereon, and return springs for always biasing the respective brake arms away from each other to move the brake shoes away from each other. Each of the brake arms has a boss portion formed with a spring accommodating cavity around a pivot, and the return spring is provided around the pivot and accommodated in the cavity. The return spring has one end engaged with the boss portion of the brake arm and the other end engaged with an adjusting member which is mounted by a ratchet sleeve on the pivot. A ratchet pawl provided on the adjusting member is opposed to and engageable with a ratchet portion of the ratchet sleeve. Accordingly, the biasing force of the return spring is adjustable by rotating the adjusting member to thereby properly position the brake shoe relative to the wheel rim. Thus, the brake shoes are adapted to give a uniform shoe clearance.

With the conventional brake described above, the ratchet pawl and a coiled spring for biasing the pawl toward the rachet portion are incorporated in the adjusting member, which therefore has an increased thickness, projects from the brake arm a large amount, appears unsightly and has the problem that the rider is unable to recognize the amount of adjustment from outside.

An object of the present invention, which has been accomplished in view of the above situation, is to provide a brake for use in bicycles which is minimized in the length of forward projection from the brake arm to give a neat appearance and which enables the rider to recognize the state to which the biasing force of the spring is adjusted.

DISCLOSURE OF THE INVENTION

To fulfill the above object, the present invention provides the following technical means.

The present invention provides a bicycle brake comprising a pair of brake arms movable toward or away from each other and each having a brake shoe, an arm mount having a pivot attachable to the body of a bicycle and supporting each of the brake arms thereon, return springs for always biasing the respective brake arms away from each other to move the brake shoes away from each other, and a spring cap directly or indirectly connected to the pivot fixedly. As a first feature of the present invention, the brake arms 5, 6 each have a boss portion 7 formed around the pivot 3 with a cavity 14 accommodating the return spring 15 therein, the return spring 15 having one end 15A engaged with the arm boss portion 7 and the other end 15B engaged with the spring cap 18, the other end 15B of at least one of the return springs 15 projecting outward beyond the outer peripheral wall of the spring cap 18 and being engageable with a plurality of engaging portions 24 formed in the outer peripheral wall and spaced apart circumferentially thereof, whereby the biasing force of the spring is made adjustable from outside.

As a second feature of the present invention, the brake arms 5, 6 each have a boss portion 7 formed around the pivot 3 with a cavity 14 accommodating the return spring 15 therein, the return spring 15 having one end 15A engaged with the arm boss portion 7 and the other end 15B engaged with the spring cap 18, said one end 15A of at least one of the return springs 15 projecting outward through a circumferential slit 27 formed in the boss portion 7, the projecting end 15A of the spring 15 being in engagement with a movable piece 31 mounted on an adjusting screw 29 externally of the boss portion 7 and movable perpendicular to the pivot 3 along the slit 27.

As a third feature of the invention, the brake arms 5, 6 each have a boss portion 7 formed around the pivot 3 with a cavity 14, each of the return springs 15 being fitted around the pivot 3 and accommodated in the cavity 14, the return spring 15 having one end 15A engaged with the boss portion 7 and the other end 15B engaged with the spring cap 18, the other end 15B of at least one of the return springs 15 being engaged with the cap by a biasing force adjusting member 36 fixed to the cap 18 and rotatable about the axis of the pivot 3 from outside.

When the brake having the first feature is operated, the opposed brake arms 5, 6 inwardly move about the respective pivots 3 toward each other, bringing the opposed brake shoes 9 into pressing contact with the respective side faces of a rim 26 to apply a braking force. At this time, the return springs 15 are forced toward the winding direction by the brake arms 5, 6, but the opposite ends 15A, 15B of each return spring 15 are in engagement with the boss portion 7 and the spring cap 18, respectively, and will not slide, so that no frictional resistance occurs. Accordingly, the brake is light to operate and produces no frictional noise.

In the case where the opposite return springs 15 are different in biasing force to produce different clearances between the rim 26 and the brake shoes 9 opposed thereto, the other end 15B of the return spring 15 in engagement with one of the engaging portions 24 is manually shifted into engagement with another engaging portion 24, whereby the return spring 15 can be wound up or unwound to adjust the tension and to thereby space the brake shoes 9 from the rim 26 by equal distances.

Further the present invention greatly diminishes the amount of projection of the spring cap outer end from the brake arm boss portion 7, while the return spring end 15B projecting outward enables the rider to visually recognize the state to which the biasing force of the spring 15 is adjusted. Thus, the brake is simple in construction and extremely easy to handle and reliably obviates the likelihood that the brake will act on only one side of the wheel.

According to the second feature described, the return spring 15 can be wound up or unwound by manually rotating the adjusting screw 29 and thereby moving the end 15A of the spring 15, whereby the tension can be adjusted to give equal spacings between the rim 26 and the brake shoes 9.

Furthermore, the present invention diminishes the amount of projection of the spring cap outer end from the brake arm boss portion 7, while the movable piece 31, which is in engagement with one end 15A of each return spring 15 and left exposed, enables the rider to visually recognize the state to which the biasing force of the spring 15 is adjusted, to steplessly adjust the spring force easily with the tips of fingers without using any tool and to thereby reliably obviate the likelihood of the brake acting on only one side of the wheel.

Further according to the third feature, the adjusting member 36, when loosened, can be rotated from outside to wind up or unwind the return spring 15, and the member 36 is thereafter fastened. By adjusting the tension of the return spring 15 in this way, equal spacings can be provided between the rim 26 and the brake shoes 9.

Further the present invention diminishes the amount of projection of the spring cap outer end from the brake arm boss portion 7, while the adjusting member 36, partly projecting outward, enables the rider to visually recognize the state to which the biasing force of the return spring 15 is adjusted and to adjust the spring force steplessly with ease. This reliably eliminates the likelihood of the brake acting on only one side of the wheel.

BRIEF DESCRIPTION OF THE DRAWINGS

FIG. 1 is a front view of a bicycle brake;

FIG. 2 is a fragmentary sectional view;

FIG. 3 is an exploded perspective view showing the brake as it is seen from the front with a yoke cable and the like omitted;

FIG. 4 is a fragmentary right side elevation;

FIGS. 5 to 7 show a second embodiment of the invention, FIG. 5 corresponding to FIG. 2, FIG. 6 to FIG. 3, and FIG. 7 to FIG. 4; and FIGS. 8 and 9 show a third embodiment, FIG. 8 corresponding to FIG. 2, and FIG. 9 to FIG. 3.

BEST MODE OF CARRYING OUT THE INVENTION

Embodiments of the present invention will be described below with reference to the drawings.

Figure 1:
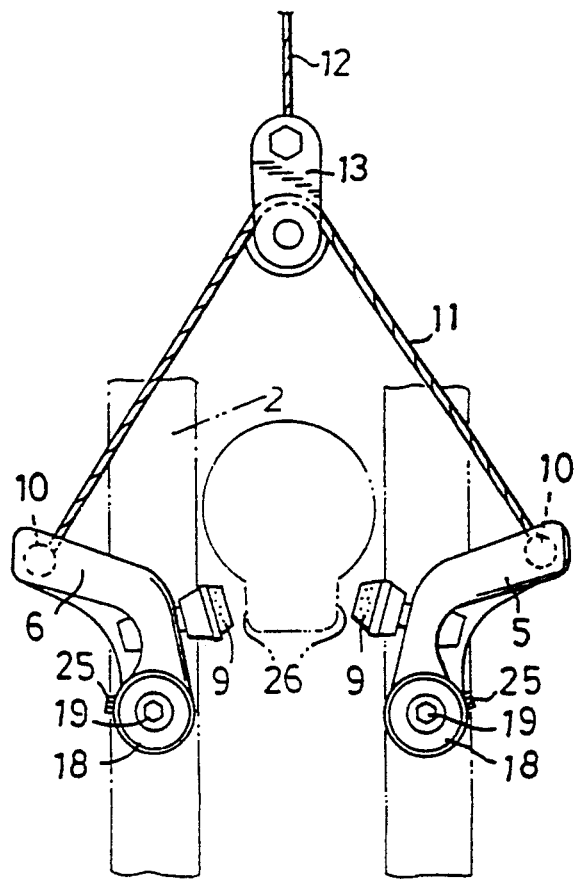
FIGS. 1 to 4 show a first embodiment of the invention.
Figure 2:
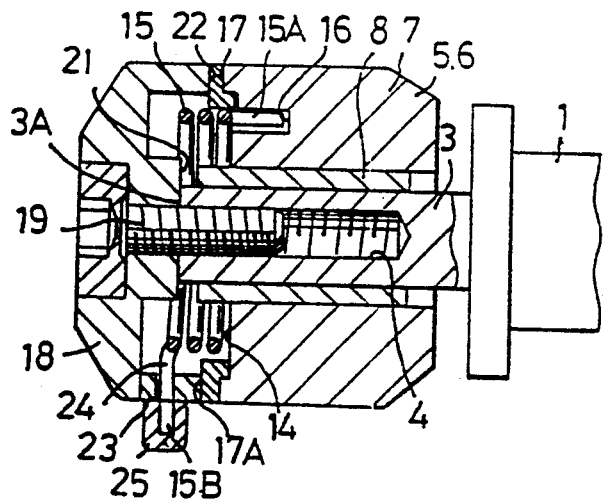
Figure 4:
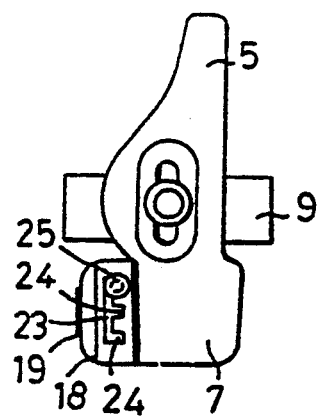
Figure 3:
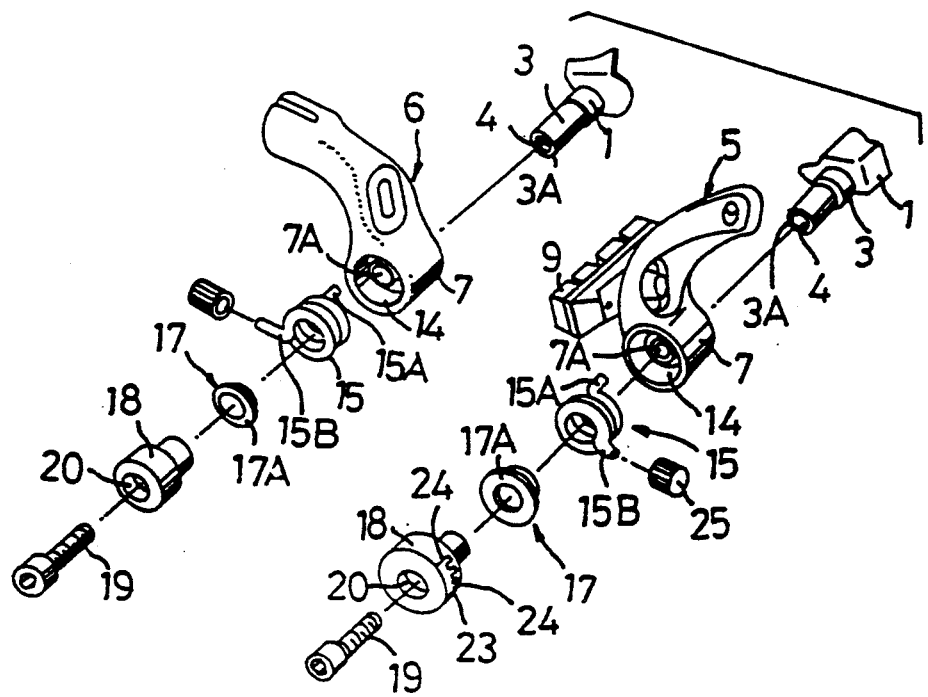

FIGS. 1 to 4 show a first embodiment of the invention, i.e., a cantilever brake. While FIG. 2 is a view in section taken along the axis of a pivot for a right brake arm, a left brake arm also has the same construction as this arm except that a return spring is wound in the opposite direction. FIG. 3 is an exploded perspective view showing opposite brake arms.

With reference to the drawings, indicated at 1 is an arm mount fixed as by a bolt to the body of a bicycle, e.g., to the fork 2 thereof, and having a pivot 3 projecting forward therefrom. The pivot centrally has an axial threaded bore 4 extending inward from its front end face 3A.

A pair of opposed cantilever brake arms 5, 6 are each formed at the lower end with a boss portion 7 which is rotatably fitted around the pivot 3 with a bush 8 provided therebetween. Brake shoes 9 opposed to each other are attached to the arms, each at an intermediate portion thereof. A yoke cable 11 is removably attached at each end thereof to the arm by a holder 10.

The yoke cable 11 is suspended from a hanger 13 connected to the lower end of a brake operating Bowden cable 12.

The boss portion 7 of each of the brake arms 5, 6 has a spring accommodating cavity 14 coaxial with a pivot bore 7A and opened toward the front. A coiled return spring 15 is accommodated in the cavity 14. The spring 15 has one end 15A engaged in a bore 16 formed in the bottom wall of the cavity 14.

The left and right return springs are opposite to each other in the winding direction; the left spring is left-handed, and the right spring, right-handed.

An annular flanged bush 17 is fitted in the open end of the cavity 14, with its flange in contact with the front end face of the boss portion 7.

A spring cap 18 has a stepped bore 20 extending through its center axially thereof for inserting a fastening bolt 19 therethrough, a rear end face serving as a pivot contact face 21 around the bore 20, and a rear end face positioned along its outer periphery and serving as a slide face 22. The slide face 22 is slidable in contact with the flange front face 17A of the flanged bush 17. The cap 18 is removably fixed to the pivot 3 by inserting the fastening bolt 19 through the stepped bore 20 from the front and screwing the bolt 19 into the threaded bore 4 of the pivot 3. Accordingly, the spring cap 18 is held against rotation even when the break arm 5 (6) rotates.

The outer peripheral wall of the spring cap 18 is formed with a generally E-shaped spring end insertion aperture 23 to provide three engaging portions 24 suitably spaced apart circumferentially of the wall. The other end (front end) 15B of the return spring 15 is inserted through the aperture to project outward. A knob 25 is secured to the projecting outer spring end. The return spring end 15B is engageable with and retainable by one of the three engaging portions 24. When to be engaged with another one of the engaging portions 24, the knob 25 is pushed forward and then shifted upward or downward, whereby the spring can be wound up or unwound.

When the brake operating lever (not shown) of the above embodiment is manipulated, the opposed brake arms 5, 6 move about the respective pivots 3 to reduce the distance between their upper ends, pressing the opposite brake shoes 9 into contact with the respective side faces of the wheel rim 26 to exert a braking force. At this time, each return spring 15 has its front end 15B secured to the arm mount 1 by the spring cap 18, fastening bolt 19 and pivot 3, so that the rear end 15A is forced toward the winding direction by the brake arm 5 (6). When the brake is released from the operating force, the brake arms 5, 6 are reversely rotated outward away from each other by the force of the return springs 15, returning the brake shoes 9 at the intermediate portion thereof to the initial position away from the rim 26.

When the tension of the return spring 15 is to be adjusted, the knob 25 is shifted upward or downward with the tips of fingers as pushed forward, and then released from the pushing force at the position of another engaging portion 24, whereupon the spring end 15B is forced into engagement with this portion 24 due to its elastic force and thereby retained. In this way, the return spring 15 is wound up or unwound to adjust the tension and the position of the brake arm 5 or 6 in balance with the other brake arm. The position of the knob 25 enables the rider to visually recognize the amount of adjustment and the magnitude of tension from outside.

With the above embodiment, the pivot 3 can be separate from the arm mount 1 and connected thereto as by a bolt. The biasing force adjusting means for changing the engaged position of the return spring front end 15B projecting from the spring cap 18 may be provided on only one of the brake arms 5, 6, whereby the same advantage as above can also be obtained.

Figure 6:
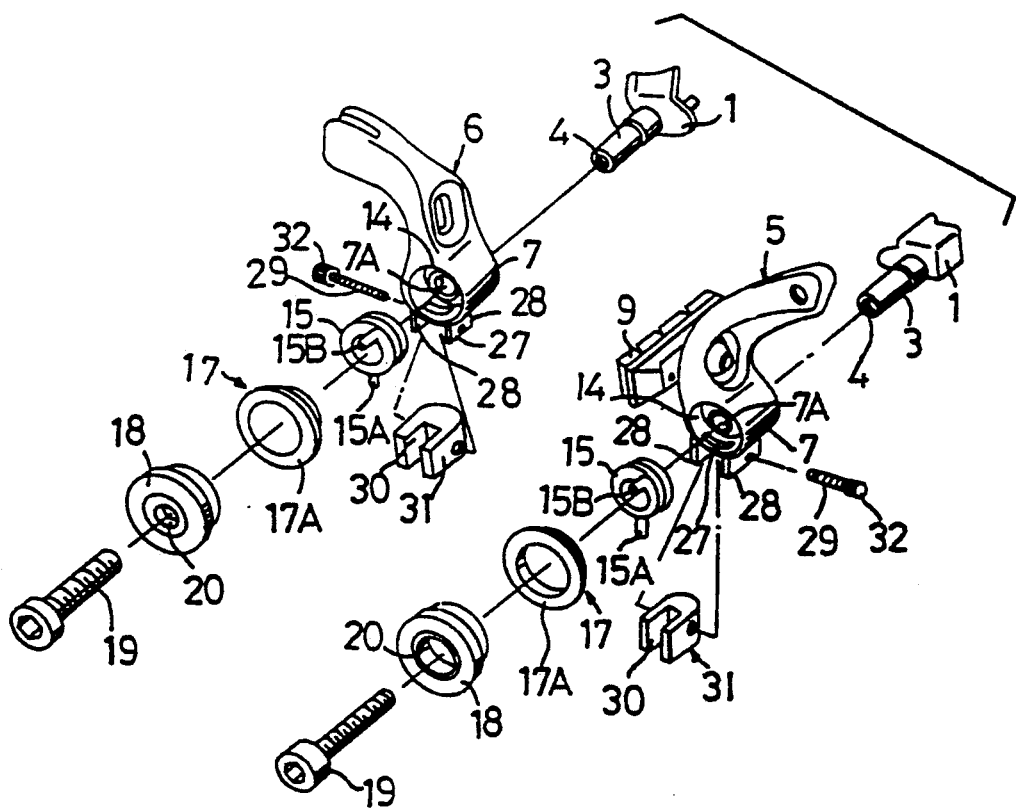

FIGS. 5 to 7 show a second embodiment of the present invention. Throughout FIGS. 1 to 7, like parts are designated by like reference numerals or symbols.

According to this embodiment, one end of the return spring 15 extends through a circumferential slit 27 formed in the lower side of the peripheral wall defining the spring accommodating cavity 14 to project out. At the circumferentially opposite ends of the slit 27, the boss portion 7 is externally provided with screw support lugs 28, 28 rotatably carrying an adjusting screw 29 for adjusting the biasing force of the spring. A generally forked movable piece 31 having a spring engaging recess 30 is screwed on the adjusting screw 29, and one end 15A of the return spring 15 is engaged in the recess 30.

Accordingly, the movable piece 31 is movable by manually rotating a knob 32 secured to one end of the adjusting screw 29 to wind up or unwind the return spring 15. The position of the movable piece 31 enables the rider to recognize the amount of adjustment from outside, and the tension is adjustable steplessly.

The left and right return springs 15 are opposite to each other in the winding direction; the left spring is left-handed, and the right spring, right-handed.

Indicated at 17 is an annular flanged bush fitted in the open end of the spring accommodating cavity 14, with the flange in contact with the front end face of the boss portion 7.

A spring cap 18 has a stepped bore 20 extending through its center axially thereof for inserting a fastening bolt 19 therethrough, a rear end face serving as a pivot contact face 21 around the bore 20, and a rear end face positioned along its outer periphery and serving as a slide face 22. The slide face 22 is slidable in contact with the flange front face 17A of the flanged bush 17. The spring cap 18 is formed in its rear face with an engaging bore 33 for the other end, i.e., the front end 15B, of the return spring 15 to engage in. The spring cap 18 is removably fixed to the pivot 3 with the fastening bolt 19 inserted through the stepped bore 20 from the front and screwed into the threaded bore 4 of the pivot 3. Accordingly, the spring cap 18 is held against rotation even if the brake arm 5 (6) rotates.

The tension of each return spring 15 of the above embodiment is adjustable by rotating the knob 32 on the adjusting screw 29 with the tips of fingers and thereby shifting the movable piece 31 perpendicular to the axis of the pivot 3 to move the rear end 15A of the return spring 15 leftward or rightward. This winds up or unwinds the spring. In this way, the tension of the return spring 15 and the balance between the opposed brake arms 5, 6 are adjustable. The position of the movable piece 31 enables the rider to visually recognize the amount of adjustment and the magnitude of the tension from outside.

Figure 9:
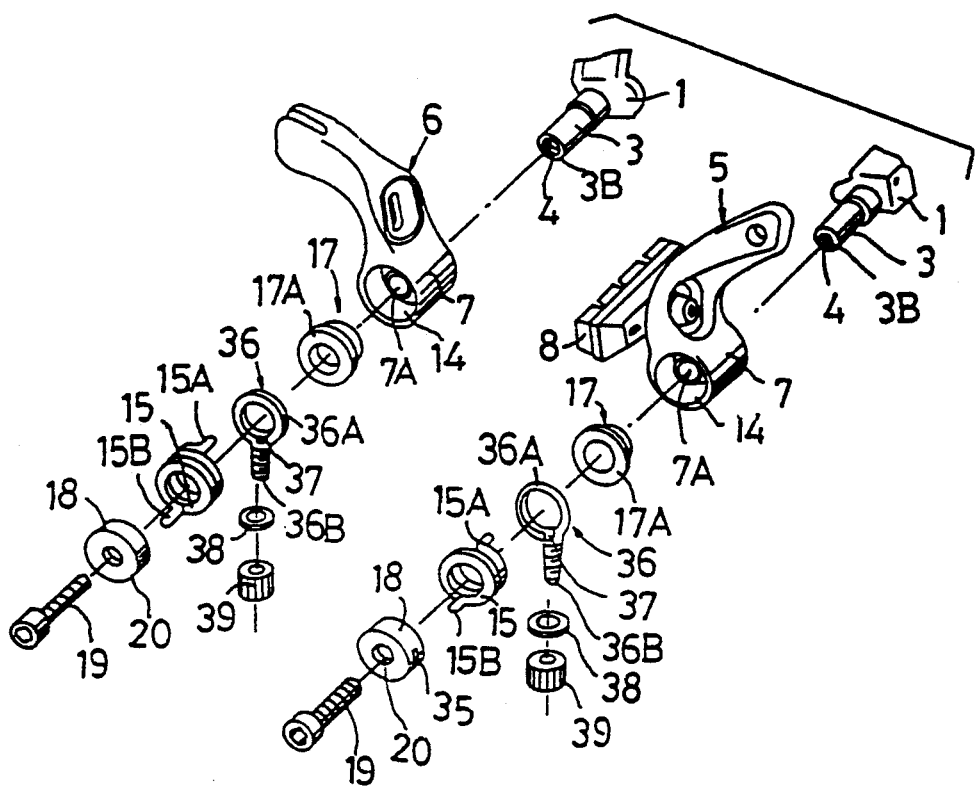

FIGS. 8 and 9 show a third embodiment of the present invention. Throughout FIGS. 1 to 4 and FIGS. 8 and 9, like parts are designated by like reference numerals or symbols.

The spring cap 18 of this embodiment has a stepped bore 20 extending through its center axially thereof for inserting a fastening bolt 19 therethrough and is formed in its rear side with an adjusting member fitting annular cavity 34 concentric with the stepped bore 20. The spring cap 18 is removably fixed to the pivot 3 with the bolt 19 inserted through the stepped bore 20 from the front and screwed into the threaded bore 4 of the pivot 3. In this arrangement, the rear face 18A of the spring cap 18 around the bore 20 is secured to the front end face 3B of the pivot 3 in pressing contact therewith, and the rear end face 18B of the outer peripheral wall of the spring cap 18 is slidable in contact with the flange front face 17A of the flanged bush 17, with the result that the spring cap 18 is held against rotation even if the brake arm 5 (6) rotates. A circumferential slit 35 is formed in the peripheral wall of the spring cap 18 defining the cavity 34.

Indicated at 36 is a biasing force adjusting member comprising an annular portion 36A and a screw portion 36B integral therewith. The annular portion 36A is formed with an insertion hole 37 for the other end 15B of the return spring 15 to engage in. The annular portion 36A is fitted in the cavity 34 of the spring cap 18, with the inner surface of the annular portion 36A rotatably fitting to the inner cylindrical surface 34A defining the cavity 34. The screw portion 36B is inserted through the slit 35. The outwardly projecting end of the screw portion carries a washer 38 and has an adjusting cap nut 39 screwed thereon. The adjusting member 36 is fixed to the spring cap 18 by tightening up the adjusting nut 39.

The tension of the return spring 15 of the above embodiment is adjustable by loosening the adjusting nut 39 by hand, then pushing the nut upward or downward to thereby rotate the adjusting member 36 about the axis of the pivot 3 and wind up or unwind the return spring 15, and tightening up the adjusting nut 39 at the desired position for locking. In this way, the tension of the return spring 15 and the balance between the opposed brake arms 5, 6 are adjustable. The position of the adjusting nut 39 enables the rider to visually recognize the amount of adjustment and the magnitude of the tension from outside.

I claim:

1. A bicycle brake comprising a pair of brake arms movable toward and away from each other and each having a brake shoe, an arm mount having a pivot attachable to the body of a bicycle and supporting each of the brake arms thereon, return springs for always biasing the respective brake arms away from each other to move the brake shoes away from each other, and a spring cap connected to the pivot fixedly, wherein each of the brake arms has a boss portion formed around the pivot with a cavity accommodating a respective one of the return springs therein, each of the return springs having one end engaged with the arm boss portion and the other end engaged with the spring cap, the other end of at least one of the return springs projecting outward beyond the outer peripheral wall of the spring cap and being engageable with a plurality of engaging portions formed in the outer peripheral wall and spaced apart circumferentially thereof, whereby the biasing force of the spring is made adjustable from outside.

2. A bicycle brake comprising a pair of brake arms movable toward and away from each other and each having a brake shoe, an arm mount having a pivot attachable to the body of a bicycle and supporting each of the brake arms thereon, return springs for always biasing the respective brake arms away from each other to move the brake shoes away from each other, and a spring cap connected to the pivot fixedly, wherein each of the brake arms has a boss portion formed around the pivot with a cavity accommodating a respective one of the return springs therein, each of the return springs having one end engaged with the arm boss portion and the other end engaged with the spring cap, said one end of at least one of the return springs projecting outward through a circumferential slit formed in the boss portion, the projecting end of the spring being in engagement with a movable piece mounted on an adjusting screw externally of the boss portion and movable perpendicular to the pivot along the slit.

3. A bicycle brake comprising a pair of brake arms movable toward and away from each other and each having a brake shoe, an arm mount having a pivot attachable to the body of a bicycle and supporting each of the brake arms thereon, return springs for always biasing the respective brake arms away from each other to move the brake shoes away from each other, and a spring cap connected to the pivot fixedly, wherein each of the brake arms has a boss portion formed around the pivot with a cavity, each of the return springs being fitted around the pivot and accommodated in the cavity, the return spring having one end engaged with the arm boss portion and the other end engaged with the spring cap, the other end of at least one of the return springs being engaged with the cap by a biasing force adjusting member fixed to the spring cap and rotatable about the axis of the pivot from outside, and wherein said biasing force adjusting member comprises a first portion, which is rotatable about the axis of said pivot within said chamber and in which said other end of the at least one of the return springs is engaged, and a second portion, which projects radially outward from said first portion through a circumferential slit in said spring cap, and wherein a gripping member is carried externally of the spring cap by which the circumferential location of said second portion can be fixed and selectively adjusted by manual manipulation thereof.

4. A bicycle brake according to claim 3, wherein the first portion of the biasing force adjusting member is annular and is carried on an annular portion of the spring cap, and the second portion thereof has a screw thread, and wherein the gripping member comprises a nut threaded onto the screw thread of said second portion for fixing and releasing the biasing force adjusting member relative to said spring cap.

* * * * *